United States Patent [19]

Khanna et al.

[11] Patent Number: 5,091,508

[45] Date of Patent: Feb. 25, 1992

[54] PROCESS FOR IMPROVING THE PROPERTIES OF POLYMERS

[76] Inventors: Yash P. Khanna, 19 Manger Rd., Morris, N.J. 07927; Annemarie C. Reimschuessel, 20, Junard Dr., Morristown, N.J. 07960

[21] Appl. No.: 700,102

[22] Filed: May 8, 1991

Related U.S. Application Data

[63] Continuation of Ser. No. 453,527, Dec. 20, 1989, abandoned.

[51] Int. Cl.⁵ .............................................. C08J 3/12
[52] U.S. Cl. .................................. 528/272; 528/502; 528/503
[58] Field of Search ................. 528/481, 502, 503

[56] References Cited

U.S. PATENT DOCUMENTS

| | | | |
|---|---|---|---|
| 2,855,377 | 10/1958 | Stott | 524/406 |
| 3,080,345 | 3/1963 | Brooks et al. | 428/397 |
| 3,261,800 | 7/1966 | Collins | 523/136 |
| 3,549,651 | 12/1970 | Oswald et al. | 524/143 |
| 3,843,615 | 10/1974 | Herwig et al. | 135/102 |
| 4,064,112 | 12/1977 | Rothe et al. | 528/272 |
| 4,200,602 | 4/1980 | Gragson | 264/28 |
| 4,200,707 | 4/1980 | Richardson | 525/2 |
| 4,231,991 | 11/1980 | Müller | 422/245 |
| 4,501,844 | 2/1985 | Chen et al. | 524/451 |
| 4,581,443 | 4/1986 | Garg | 528/480 |
| 4,687,838 | 8/1987 | Mumcu et al. | 528/496 |
| 4,868,240 | 9/1989 | Ichikawa et al. | 524/609 |
| 4,876,326 | 10/1989 | Rhinehart | 528/272 |

OTHER PUBLICATIONS

Gurato et al., "Influence of Nucleating Agents on the Crystallization of 6-Polyamide", *Makromol. Chem.*, 179, pp. 231-245 (1978).

Koutsky et al., "Nucleation of Polymer Droplets", *J. of Applied Physics*, 38, No. 4, pp. 1832-1839 (1967).

Chatterjee et al., "Heterogeneous Nucleation of Crystallization of High Polymers . . . Morphologies", *J. of Poly. Sci.*, 13, pp. 2369-2383 (1975).

*Primary Examiner*—John Kight, III
*Assistant Examiner*—Sam A. Acquah

[57] ABSTRACT

This invention relates to a process of modifying the crystallization temperature ($T_{cc}$) of polymers, such as polyesters or polyamides, the polymers produced by this process and the molding compositions containing these polymers. The process comprises cooling a polymer to a temperature sufficient to allow grinding of the polymer to an effective particle and then grinding said polymer to the effective particle size in order that the polymer exhibits an increased $T_{cc}$.

14 Claims, No Drawings

5,091,508

PROCESS FOR IMPROVING THE PROPERTIES OF POLYMERS

This application is a continuation of application Ser. No. 453,527 filed Dec. 20, 1989, now abandoned.

BACKGROUND OF THE INVENTION

1. Field of the Invention

This invention relates to a process for modifying the crystallization temperature and other properties of polymers, especially polyamides, by freeze-grinding said polymers.

2. Prior Art

X-ray diffraction studies of synthetic linear polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55 C and 150 C results in at least a partial conversion of the amorphous form into the gamma-form. At temperatures above 150 C, a transition of the gamma- into the alhpa-form occurs. This monoclinic alpha structure represents a highly ordered crystalline from that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from nylon 6, it is desirable, therefore, to produce a highly crystalline material, crystallized predominantly in the stable alpha-form, with an extremely fine, dense and uniform morphological structure. Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt; however, under these conditions, large spherulites develop which is not desirable. Moreover, the process is not economical. Crystallinity and the uniformity of the morphological structure can also be increased by annealing treatments after solidification. However, such practices are not economically feasible in ordinary industrial fabricating procedures as, for example, injection molding. More recently, investigators have found that bodies shaped from polyamides having a homogeneous and fine spherulitic structure can be obtained by addition to the polyamide melt of finely divided nucleating agents which act as crystallization nuclei. (e.g. U.S. Pat. Nos. 2,855,377; 3,261,800 and 3,080,345; Belgian Patent 674,170; Japanese Patent Nos. 52-105958 and 80-041623, U.S. Pat. No. 4,501,844; Gurato, G. et al. "Influence of Nucleating Agents on the Crystallization of Nylon 6", *Makromol. Chem.*, Vol. 179(1), pp. 231 to 245 (1978); Chatterjee, A.M., et al., "Heterogeneous Nucleation of Crystallization of High Polymers From the Melt", *J. Polym. Sci., Polym. Phys. Ed.*, Vol. 13(12), pp. 2368–83 (1975); and Koutsky, J.A., "Nucleation of Polymer Droplets", J. Appl. Phys., Vol. 38(4), pp. 1832–39 (1967).

The function of nucleating agents when cooling semicrystalline polymers from the molten into the solid form is to increase the number of nuclei formed in a given time interval at a predetermined temperature. The final and over-all crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyamide, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

Other prior art describes other additives which can be used in addition to nucleating agents to enhance their effectiveness. For example, U.S. Pat. No. 3,549,651 discloses that the effectiveness of nucleating agents for linear polyamides in terms of the rate of crystallization into the desirable crystalline form can be increased by using a plasticizer in conjunction with the nucleating agent. U.S. Pat. No. 4,200,707 discloses the use of zinc phenyl phosphinate and zinc phenyl phosphonate as nucleating agents for certain polyamides.

SUMMARY OF THE INVENTION

Presently, it has been discovered that the crystallization temperature ($T_{cc}$) of a polymer can be increased by cooling and grinding the polymer (hereinafter the referred to as "freeze-grinding"). The invention is directed to the above process of freeze-grinding a polymer to increase its $T_{cc}$, the polymers produced there-from as well as the molded compositions incorporating these polymers. More particularly, the invention is directed to a process for increasing the crystallization temperature ($T_{cc}$) of a polymer which comprises:

a) cooling a polymer to a temperature sufficient to allow grinding of said polymer to an effective particle size, and b) grinding said polymer to said effective particle size, such that the $T_{cc}$ of the polymer is increased, said grinding effected while maintaining the polymer at the above temperature.

As stated above, freeze-grinding of the polymer affects the crystallization temperature ($T_{cc}$) of the polymer. The crystallization temperature upon cooling reflects the overall crystallization rate due to the combined effects of nucleation and growth of crystallites/spherulites. A non-nucleated polymer would have a lower $T_{cc}$ than a nucleated material, and a polymer crystallizing at a lower rate would have a lower $T_{cc}$ than a faster crystallizing polymer. It is believed that an incease in $T_{cc}$ and the corresponding increase in the crystallization rate indicate an improvement in the thermal, optical and/or mechanical properties of the polymer. See "Memory Effects in Polymers II. Processing History vs. Crystallization Rate of Nylon 6-Observation of Phenomenon and Product Behavior", Y.P. Khanna et al. in *Polymer Engineering and Science*, 24, Vol. 28, pp. 1600-1606 December 1988 and also "Memory Effects in Polymers III", Y.P. Khanna et al. in *Polymer Engineering and Science*, 24, Vol. 28, pp. 1607-1611, December 1988, for additional information regarding the effects of processing of a polymer on the Tcc.

DETAILED DESCRIPTION OF THE EMBODIMENTS

The process of this invention involves the freeze-grinding of a polymer. The process comprises cooling a polymer to a temperature sufficient to allow grinding of said polymer to an effective particle size and then grinding the polymer to the effective particle size such that the crystallization temperature of the ground polymer is increased. The temperature for cooling is maintained in order to grind said polymer to the effective particle size.

The cooling temperature will vary with the polymer used. The cooling temperature need only enable the polymer to be reduced to an effective particle size upon grinding. It is preferred that the temperature is equal to or less than about $-60°$ C., more preferably, the cooling temperature is equal to or less than about $-100°$ C. In a particularly preferred embodiment, the temperature is equal to or less than about $-160°$ C. or even equal to or less than about $-170°$ C. Any method of cooling the polymer can be employed. A preferred method of cooling the polymer is by applying liquid nitrogen.

Once cooled, the polymer is ground to an effective particle size. The effective particle size is the particle size at which the $T_{cc}$ of the polymer is greater than that of the polymer prior to subjection to the freeze-grinding process. The particle size is less than about 1500 microns, and preferably at least less than about 500 microns. In particularly preferred embodiments, the particle size is less than about 100 microns. In the most preferred embodiment, the particle size is less than about 50 microns.

Any grinding method or combination of methods which reduces the polymer to the effective particle size is suitable. For example, the polymer can be ground by application of pressure or mechanical means as well as ultrasonic or electrical methods. Illustrative of such methods are high intensity grinding, compression or nipping, impact tumbling or milling, and cutting or shredding.

Any polymer material, can be subjected to the process of this invention. For example, useful material may vary from a newly polymerized material to previously processed polymer or scrap polymer.

Preferably, the polymers subjected to the freeze-grinding process of this invention are "virgin" or "untreated" polymer. The term "untreated" refers to as-polymerized polymer; that is polymer directly from the polymerization reactor which has not been subjected to any processing. The "virgin" polymer refers to an as-polymerized polymer which is pelletized, leached and dried prior to freeze-grinding. Any conventional method for polymerizing the polymer is suitable for forming the polymer to be used in the process of this invention. The selected polymerization method is not critical.

The polymers of this invention possess a crystallization temperature which is greater than that of the same virgin polymer which has not been subjected to freeze-grinding. The difference in crystallization is actually at least about $10°$ C., however, in some instances may be less. The crystallization temperature or these polymers is preferably at least about 15, or even more preferably at least about $20°$ C., above that for untreated or unprocessed virgin polymer. In the most preferred embodiment of the invention, increased cyrstallization temperature is at least about $30°$ C. above that for the corresponding untreated or virgin polymer.

There are many polymers which may be used. Any polymer which exhibits a crystallization temperature upon cooling may be employed in the practice of the invention. Preferably, a thermoplastic polymer is employed. Illustrative of suitable thermoplastic polymers are polyvinyls, fluorocarbons, linear polyolefins, polyamides, polyurethane prepolymer, polystyrene and linear polyesters and acrylic resins. The term "fluorocarbons" includes fluorinated ethylenic polymers which may or may not be chlorinated.

The specific type of polymer employed will depend on the physical properties and features, such as tensile strength, elastic modulus and the like, which are desired in the final product. Blends of two or more polymers may also be used in the practice of the invention.

In a preferred embodiment, the polymer used is a synthetic linear polycarbonamides. Polycarbonamides are characterized by the presence of recurring carbonamide groups as an integral part of the polymer chain which are separated from one by at least two carbon atoms. Polyamides of this type include polymers, generally known in the art as nylons, obtained from diamines and dibasic acids having the recurring unit represented by the general formula:

$$-NHCORCONHR^1-$$

in which R is an alkylene group of at least tow carbon atoms, preferably from about 2 to about 10; and $R^1$ is selected from R and phenyl groups. Also included are copolyamides and terpolyamides obtained by known methods, as for example, by condensation of hexamethylene diamine and a mixture of dibasic acids consisting of terephthalic acids and derivatives thereof, as for example, lactams.

Polyamides of the above description are well known in the art and include, for example, the copolyamide of 30% hexamethylene diammonium isophthalate and 70% hexamethylene diammonium adipate, the copolyamide of up to 30% bis-(p-amidocyclohexyl)methylene, and terephthalic acid and caprolactam, poly(hexamethyleneadipamide) (nylon 66), poly(4-aminobutyric acid) (nylon 4), poly(7-aminoheptanoic acid) (nylon 7), poly(8-aminooctanoic acid) (nylon 8), poly(6-aminohexanoic acid) (nylon 6), poly(hexamethylene sebacamide) (nylon 6,10), poly(heptamethylene pimelamide) (nylon 7,7), poly(octamethylene suberamide) (nylon 8,8), poly(hexamethylene sebacamide) (nylon 6,10), poly(nonamethylene azelamide) (nylon 9,9), poly(decamethylene azelamide) (nylon 10,9), poly(decamethylene sebacamide (nylon 10,10), poly[bis(-4aminocyclohexyl)methane-1,10-decanedicarboxamide] [(Quiana) (trans)], poly(m-xylylene adipamide), poly(p-xylylene sebacamide), poly(2,2,2-trimethylhexamethylene terephthalamide), poly(piperazine sebacamide), poly(mehtaphenylene isophthalamide) (Nomex), poly(p-phenylene terephthalamide) (Kevlar), poly(11-aminoundecanoic acid) (nylon 11), poly(12-aminododecanoic acid) (nylon 12), polyhexamethylene isophthalamide, polyhexamethylene terephthalamide, poly(9-aminononanoic acid) (nylon 9) polycaproamide, or combinations thereof.

Preferred embodiments employ polyamides. Among these preferred polymers, the particularly preferred are those embodiments in which the polyamide is nylon 6 or nylon 66. The polyamide for use in the most preferred embodiments of this invention is polycaprolactam which is commercially available from Allied-Signal Inc. under the tradename Capron™ Nylon.

Other optional ingredients, for example nucleating agents, may be employed while forming the virgin polymer or added to the polymer melt after freeze-grinding. Useful nucleating agents may vary widely and can be any such material which is known for use in crystalline polymer as a nucleating agent. Illustrative of such materials are talc, mica, kaolin, asbestos, alumina, silica, silver bromide, graphite, molybdenum disulfide, lithium fluoride, sodium phenylphosphinate, sodium isobutylphosphinate, magnesium oxide, mercuric bromide, mercuric chloride, cadmium acetate, lead acetate, silver chloride, kieselguhr and the like. Preferred for use in the practice of this invention are talc, mica, kaolin, kieselguhr and asbestos.

Another embodiment of this invention is the molding composition formed from the polymer produced by freeze-grinding process. A molding composition formed using one or more polymers of this invention can include various optional components, such as additives commonly employed with polyester and polyamide resins. Optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

While not essential, it may be desirable to include an optional plasticizer in the composition of this invention. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in linear polyamide molding compositions. Preferred plasticizers are those which are useful with polycaprolactam. Such useful plasticizer compositions are well known in the art and accordingly will not be described herein in detail.

The molding composition of this invention preferably includes a fibrous or particulate filler, which functions to increase the modulus and stiffness of the composition, and provides a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like. Such fillers are well known materials and are readily available. The foregoing recited fillers are illustrative only and are not meant to limit the scope of the fillers that can be employed in this invention. In the preferred embodiments of this invention, fibrous materials such as fiber glass, carbon fibers, boron fibers and polymer fibers are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of from about 30 to about 90 wt % on the same basis.

The molding composition of this invention can be further modified by the addition of one or more pigments. Illustrative of useful pigments are iron oxide, cadmium red, rhodamine, chrome yellow, chrome green, and phthalocyanine blue.

The molding composition of this invention can be prepared by blending or mixing the essential ingredients, and other optional components, as uniformly as possible employing any conventional blending means. Appropriate blending means, such as melt extrusion, batch melting and the like, are well known in the art and will not be described herein in greater detail. Blending temperatures and blending pressures, and the order of addition of the various components are not critical and may be varied as desired provided that a substantially homogeneous composition results. The blending procedure can be carried out at elevated temperatures, in which case the polymer component is melted and other optional ingredients are admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

The molding compositions according to the invention can be partially crystalline to amorphous, depending on which individual constituents are employed. They are thermoplastic materials from which molded articles of manufacture having valuable properties can be produced by conventional shaping processes, such as melt spinning, casting, injection molding and extruding. The molded compositions are components for technical equipment, apparatus castings, household equipment, sports equipment, components for the electrical and electronics industries and electrical insulations, car components, circuits, fibers, and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are also suitable for the production of sheets and panels having valuable properties. The sheets and panels according to the invention are suitable as coating materials for other materials comprising, for example, wood, glass, ceramic, metal or other plastics, and outstanding strengths can be achieved using conventional adhesion promoters, for example, based on vinyl resins. The sheets and panels can also be alminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films. The compositions of this invention are especially useful for fabrication of extruded films, as for example, films for use in food packaging. Such films can be fabricated using conventional film extrusion techniques.

EXAMPLE I

Commercially available poly(caprolactam), nylon 6, (trade description Capron® grade 8207F) obtained from Allied-Signal, Inc. having molecular weight of 35,000 to 40,000 was used. The nylon 6 is commercially available as virgin pellets. Virgin pellets have been made by pelletizing a strand of as-polymerized material, chip leaching and then drying. (Sample A).

Some virgin pellets were pressed into a thin film at 25 C under a pressure of 0.6 GPa (Sample B). Some of the virgin pellets were cut into small shavings with a razor blade (Sample C). Other virgin pellets were frozen with dry ice and ground into a powder with particle size of approximately 1500 microns (Sample D). Virgin pellets were also frozen with liquid nitrogen (−170° C.) in a SPEX Freezer Mill and also ground, by impacting the frozen pellets with a metal bar moving back and forth within the Spex Freezer Mill into a powder with a particle size of approximately 50 microns (Sample E).

For each of the above samples the crystallization temperature was evaluated using Differential Scanning Calorimetry (DSC) experiments. A sample of 10.0±0.2 mg was crimped in an aluminum cup, heated to 280° C. at a programmed rate of 10° C./min under argon to obtain the crystallization peak, $T_{cc}$. The results are summarized in Table I.

TABLE I

| Samples | Tcc, °C.* |
|---------|-----------|
| A | 168, 169 |
| B | 171 |
| C | 169 |
| D | 169 |
| E | 186 |

*A reasonable temperature margin is ± about 1° C. for each measurement.

As shown in Table I, nylon 6 treated in accordance with the process of this invention has a higher crystallization temperature than untreated nylon 6.

What is claimed is:

1. A process for increasing the crystallization temperature of a polymer which comprises the steps of
   a) cooling said polymer to a temperature sufficient to allow grinding of the polymer to an effective particle size, and
   b) grinding said cooled polymer to form a ground polymer having said effective particle size such that the crystallization temperature, $T_{cc}$, of said ground polymer is greater than the crystallization temperature of said polymer, said grinding effected while maintaining the polymer at the above temperature.

2. A process in accordance with claim 1 wherein said polymer is ground to a particle size of at least about 50 microns.

3. A process in accordance with claim 2 wherein said particle size is equal to or less than about 100 microns.

4. A process in accordance with claim 3 wherein said particle size is equal to or less than about 50 microns.

5. The process in accordance with claim 1 wherein the $T_{cc}$ of said ground polymer is at least about 10° C. higher then the crystallization temperature of said polymer.

6. The process in accordance with claim 1 wherein the $T_{cc}$ of said ground polymer is at least about 15° C. higher than the $T_{cc}$ of said polymer.

7. A process in accordance with claim 1 wherein said polymer is cooled in step (b) to a temperature equal to or less than about −60° C.

8. A process in accordance with claim 1 wherein said polymer is cooled to a temperature equal to or less than about −160° C.

9. A process in accordance with claim 1 wherein said polymer is cooled to a temperature equal to or less than about −170° C.

10. A process in accordance with claim 1 wherein said polymer is cooled using liquid nitrogen.

11. The process in accordance with claim 1 wherein said polymer is a polyamide or polyester.

12. The process in accordance with claim 11 wherein said polymer is a polyamide.

13. The process of claim 12 wherein said polymer is nylon 6 or nylon 6,6.

14. The process of claim 1 wherein the cooling of (a) and grinding of (b) occur simultaneously.

* * * * *